United States Patent
Wu et al.

(10) Patent No.: US 9,062,224 B2
(45) Date of Patent: Jun. 23, 2015

(54) STRETCHABLE INK COMPOSITION

(71) Applicant: XEROX CORPORATION, Norwalk, CT (US)

(72) Inventors: Yiliang Wu, Oakville (CA); Cameron Derry, London (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 13/957,374

(22) Filed: Aug. 1, 2013

(65) Prior Publication Data

US 2014/0220314 A1    Aug. 7, 2014

Related U.S. Application Data

(60) Provisional application No. 61/849,815, filed on Feb. 6, 2013.

(51) Int. Cl.

| | | |
|---|---|---|
| C09D 11/30 | (2014.01) | |
| C08F 220/18 | (2006.01) | |
| C08F 2/50 | (2006.01) | |
| C08F 8/30 | (2006.01) | |
| C08F 220/16 | (2006.01) | |
| C08F 283/04 | (2006.01) | |
| C08F 220/10 | (2006.01) | |
| C08F 220/26 | (2006.01) | |
| C08F 220/12 | (2006.01) | |
| C08F 220/20 | (2006.01) | |
| C08F 265/06 | (2006.01) | |
| C08J 3/24 | (2006.01) | |
| C08J 3/20 | (2006.01) | |
| C08K 3/00 | (2006.01) | |
| C08K 5/00 | (2006.01) | |
| C08L 33/08 | (2006.01) | |
| C08L 67/07 | (2006.01) | |
| C08K 5/07 | (2006.01) | |
| C08L 33/12 | (2006.01) | |
| C08L 75/16 | (2006.01) | |
| C08L 33/10 | (2006.01) | |
| C08K 5/5397 | (2006.01) | |
| C09D 11/104 | (2014.01) | |
| C09D 175/16 | (2006.01) | |
| C09D 11/10 | (2014.01) | |
| C09D 11/02 | (2014.01) | |
| C09D 167/07 | (2006.01) | |
| C09D 11/102 | (2014.01) | |
| C09D 11/107 | (2014.01) | |
| C09D 11/101 | (2014.01) | |

(52) U.S. Cl.
CPC ........... *C09D 11/30* (2013.01); *Y10T 428/2481* (2015.01); *Y10T 428/24934* (2015.01); *Y10T 428/24802* (2015.01); *C08F 220/18* (2013.01); *C08F 2/50* (2013.01); *C08F 8/30* (2013.01); *C08F 220/16* (2013.01); *C08F 283/045* (2013.01); *C08F 220/10* (2013.01); *C08F 220/26* (2013.01); *C08F 220/12* (2013.01); *C08F 220/20* (2013.01); *C08F 265/06* (2013.01); *C08J 3/24* (2013.01); *C08J 3/20* (2013.01); *C08J 2333/08* (2013.01); *C08J 2333/10* (2013.01); *C08J 2333/12* (2013.01); *C08K 3/0033* (2013.01); *C08J 2367/07* (2013.01); *C08K 5/00* (2013.01); *C08K 5/0025* (2013.01); *C08J 2375/16* (2013.01); *C08L 33/08* (2013.01); *C08L 67/07* (2013.01); *C08K 5/07* (2013.01); *C08L 33/12* (2013.01); *C08L 75/16* (2013.01); *C08L 33/10* (2013.01); *C08K 5/5397* (2013.01); *C08L 2312/00* (2013.01); *C09D 11/104* (2013.01); *C09D 175/16* (2013.01); *C09D 11/10* (2013.01); *C09D 11/02* (2013.01); *C09D 167/07* (2013.01); *C09D 11/102* (2013.01); *C09D 11/107* (2013.01); *C09D 11/101* (2013.01)

(58) Field of Classification Search
CPC .............................. C09D 11/30; C09D 11/101
USPC .................................................... 523/160, 161
See application file for complete search history.

(56) References Cited

U.S. PATENT DOCUMENTS 7,776,975 B2 *   8/2010   Blankenship et al. .......... 526/82
2011/0032304 A1 *   2/2011   Mozel et al. .................... 347/21

OTHER PUBLICATIONS

Yiliang Wu, et al., U.S. Appl. No. 13/495,915, filed Jun. 13, 2012.
Yiliang Wu, et al., U.S. Appl. No. 13/182,579, filed Jul. 14, 2011.

* cited by examiner

*Primary Examiner* — Doris Lee
(74) *Attorney, Agent, or Firm* — Pillsbury Winthrop Shaw Pittman LLP

(57) ABSTRACT

An ink composition suitable for ink jet printing, including printing on deformable substrates. In embodiments, the stretchable ink composition is based on an aqueous ink formulation that provides a more cost-efficient ink over formulations and provides robust images, even when printed on deformable substrates. These ink compositions can be used for ink jet printing.

15 Claims, 1 Drawing Sheet

STRETCHABLE INK COMPOSITION

STATEMENT OF RELATED APPLICATIONS

This application claims priority to U.S. Provisional Application 61/849,815 filed Feb. 6, 2013, the entire contents of which are incorporated herein by reference in its entirety.

This application is related to co-pending and co-owned U.S. patent application Ser. No. 13/957,213, entitled "Stretchable Ink Composition", filed herewith; and U.S. patent application Ser. No. 13/957,185, entitled "A Solventless Radiation Curable Stretchable Ink Composition", each of the foregoing being commonly assigned and incorporated herein by reference in their entireties.

BACKGROUND

The present embodiments relate to ink compositions suitable for printing marks or images on deformable substrates. In particular, disclosed herein is a stretchable aqueous ink composition that is more cost-efficient over formulations and provides robust images, even when printed on deformable substrates. These ink compositions can be used for ink jet printing.

Printing marks or images on deformable substrates is desirable for many applications, such as flexible medical devices, including surgical tools and implantable medical devices, robot skins, textiles (e.g., for stretchable swimming suits), rubber products such as tires, tubes, and cables, and the like. Consumable products based on rubbers and some textiles are also stretchable. Because of the highly deformable characteristic of the substrate, a stretchable ink is desired for printing on such substrates to achieve excellent image quality, image robustness, and image longevity. Another desirable attribute is an ink made from low cost materials.

Accordingly, while known compositions and processes are suitable for their intended purposes, a need remains for improved ink compositions with certain characteristics. Specifically, a need remains for low cost ink compositions suitable for printing on deformable or stretchable substrates. Additionally, a need remains for stretchable inks that form robust images which can be stretched and relaxed for a high number of cycles. There is also a need for stretchable inks that have good color stability. There is also a need for stretchable inks that exhibit good resistance to environmental factors such as light, chemicals, water, and oxidizing gases, thus generating hydrophobic and water-resistance images. Ideally, the stretchable ink would be suitable for both indoor and outdoor applications. Lastly, it would be desirable that such inks can be applied digitally.

Previous work by the inventors included a stretchable ink composition based on fluoroelastomer emulsions, as disclosed in U.S. patent application Ser. No. 13/182,579 to Wu et al., filed on Jul. 14, 2011, which is hereby incorporated by reference in its entirety and a stretchable ink composition based on polyurethane emulsions, as disclosed in U.S. patent application Ser. No. 13/495,915 to Wu et al., filed on Jun. 13, 2012, which is hereby incorporated by reference in its entirety.

SUMMARY

According to embodiments illustrated herein, there is provided a stretchable ink composition comprising water, a co-solvent, a surfactant, an acrylate elastomer latex, and a colorant, wherein the stretchable ink composition is capable of printing and forming robust images on a deformable substrate.

In particular, the present embodiments provide a stretchable ink composition comprising a first latex comprising a first acrylate elastomer, a second latex comprising a second acrylate elastomer, a dispersion comprising a colorant and a surfactant, water, and an optional co-solvent.

In further embodiments, there is provided a patterned article comprising a deformable substrate and an image printed on the deformable substrate, the image being formed from a stretchable ink comprising water, a co-solvent, a surfactant, an acrylate elastomer latex, and a colorant.

BRIEF DESCRIPTION OF THE DRAWINGS

For a better understanding of the present embodiments, reference may be had to the accompanying figures.

DETAILED DESCRIPTION

Figure 1:
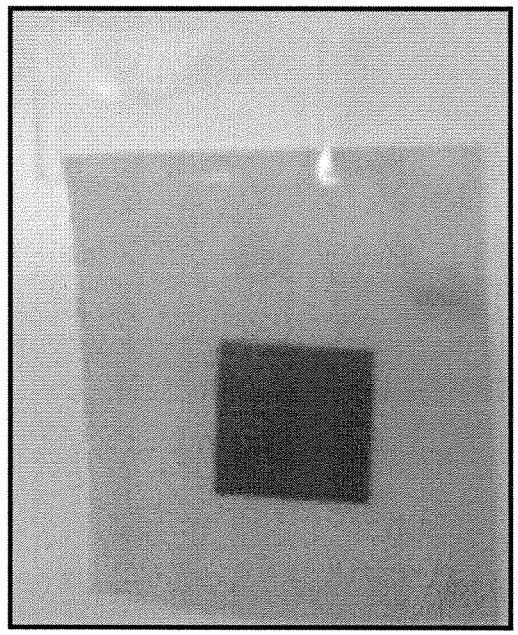
FIG. 1 is a photograph of an image, after stretching an elastomeric latex substrate over 300% in multiple directions hundreds of times and after being subjected to a tape test, on a deformable substrate printed using a stretchable ink composition made according to the present embodiments.

In the following description, it is understood that other embodiments may be utilized and structural and operational changes may be made without departure from the scope of the present embodiments disclosed herein.

The present embodiments provide an aqueous ink formulation comprising an acrylate elastomer, colorant and one or more solvents. In further embodiments, the ink formulation comprises a nano-sized latex of the acrylate elastomer materials with a pigment dispersion. The formulation provides a cost-efficient stretchable ink composition that can be inkjet printed onto various deformable substrates, such as for example, a stretchable latex rubber substrate, with image longevity. The printed images exhibit superior performance on the deformable substrates, which are generally difficult to print upon.

In general embodiments, the stretchable ink composition is based on an aqueous formulation comprising an emulsion of elastomer materials. An elastomer is defined by the Collins English Dictionary as any material, such as natural or synthetic rubber, that is able to resume its original shape when a deforming force is removed. In embodiments, the elastomer material is an acrylate elastomer. An acrylate elastomer, for the purposes of the present disclosure, is an acrylate that behaves according to the above definition of an elastomer.

In embodiments, the stretchable aqueous ink formulation uses nano-sized latex of acrylate elastomer materials in combination with pigment dispersions. In particular, low $T_g$ copolymers of butyl acrylate and methacrylate, or acrylate and vinylacetate were used. These starting materials provide a low-cost acrylate latex. With proper surfactants, the acrylate latex can be mixed together with pigment dispersion very well without forming any agglomerates. The viscosity of the mixture can be readily adjusted by the ratio of co-solvents for inkjet printing. After being printed on stretchable substrates and dried, the pigmented film forms very robust images which can be stretched up to 300% for thousands of cycles. Other benefits of the ink include good adhesion on latex substrate and tunable drying time.

Acrylate (also called acrylic esters) polymers are a class of polymers comprising the following structure:

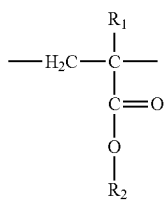

Wherein $R_1$ may be a hydrogen or an alkyl group, such as a methyl group, $R_2$ may be an alkyl group which is optionally substituted. Although fluoroelastomer and polyurethane emulsions serve useful purposes in their own right, for general applicability, a low cost elastic material can be beneficial. Thus, the present embodiments provide for a stretchable aqueous ink formulation based on acrylate elastomer materials.

In embodiments, the acrylate elastomer latex comprises a copolymer comprising acrylate. In some such embodiments, the copolymer may be selected from the group consisting of a copolymer of acrylate and chloroethylvinyl ether, a copolymer of acrylate and acrylonitrile, a copolymer of acrylate and styrene, a copolymer of acrylate and vinyl acetate, a copolymer of acrylate and ethylene, a copolymer of acrylate and methacryate and mixtures thereof. In specific embodiments, the acrylate elastomer latex is a copolymer of butyl acrylate and methacrylate or acrylate and vinylacetate.

In embodiments, the acrylate elastomer latex comprises a mixture of a first acrylate latex and a second acrylate latex. In some embodiments, the first acrylate latex is selected from the group consisting of a copolymer of acrylate and methacrylate, a copolymer of methacrylate and vinyl acetate, a copolymer of acrylate and styrene and mixtures thereof, and the second acrylate latex is selected from the group consisting of a copolymer of acrylate and chloroethylvinyl ether, a copolymer of acrylate and acrylonitrile, a copolymer of acrylate and styrene, a copolymer of acrylate and vinyl acetate, a copolymer of acrylate and ethylene, and mixtures thereof. In some such embodiments, the first acrylate latex has a glass transition temperature greater than about 0° C. including greater than about 5° C. and greater than about 10° C., but less than about 100° C., or less than about 80° C. including less than about 60° C. The second acrylate latex has a glass transition temperature less than about 0° C. including less than about 10° C. or less than about −20° C.

In some embodiments, the acrylate elastomer latex may have an average particle size of from about 20 to about 600 nm, or from about 50 nm to about 500 nm, or from about 50 to about 300 nm.

In embodiments, the acrylate elastomer may be present in any desired or effective amount, in one embodiment at least about 0.1 percent by weight of the ink, in another embodiment at least about 1 percent by weight of the ink, and in yet another embodiment at least about 2 percent by weight of the ink, and in one embodiment no more than about 25 percent by weight of the ink, in another embodiment no more than about 20 percent by weight of the ink, and in yet another embodiment no more than about 15 percent by weight of the ink, although the amount can be outside of these ranges.

With suitable surfactants, the acrylate latex is mixed together with the colorant dispersion without forming any agglomerates. As a result, the colorant is homogenously dispersed throughout the acrylate matrix. In other words, both the colorant particles and the acrylate latex particles retain their primary particle size after mixing. The overall particle size of the stretchable ink formulation including the colorant particles, the latex particles and/or the coalesced colorant and latex particles may be no more than about 600 nm, including no more than about 500 nm, or no more than about 300 nm, for example from about 20 nm to about 600 nm. The viscosity of the mixture can subsequently be adjusted for inkjet printing. After being printed on a deformable substrate and dried, the ink composition forms robust images that could be stretched up to 110% or 150% for thousands of cycles in multiple directions. In further embodiments, the images can be stretched up to 300% for hundreds of cycles or up to 500% for hundreds of cycles in multiple directions.

Any surfactant that forms a latex of the acrylate elastomer in the ink can be employed. Examples of suitable surfactants include anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurote, polyoxyethylene stearyl ether, polyoxyethylene nonylphenyl ether, dialkylphenoxy poly (ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™, and ANTAROX 897™. Other examples of suitable nonionic surfactants include a block copolymer of polyethylene oxide and polypropylene oxide, including those commercially available as SYNPERONIC PE/F, such as SYNPERONIC PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ available from Daiichi Kogyo Seiyaku, combinations thereof, and the like. Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used. The surfactant is present in any desired or effective amount, in one embodiment at least about 0.01 percent by weight of the ink, and in one embodiment no more than about 5 percent by weight of the ink, although the amount can be outside of these ranges. It should be noted that the surfactants are named as dispersants in some cases.

The inks disclosed herein contain an aqueous liquid vehicle. The liquid vehicle can consist solely of water, or it can comprise a mixture of water and a water soluble or water miscible organic component, referred to as a co-solvent, humectant, or the like (hereinafter cosolvent) such as alcohols and alcohol derivatives, including aliphatic alcohols, aromatic alcohols, diols, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3,-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxypropionic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof. When mixtures of water and water soluble or miscible organic liquids are selected as the liquid vehicle, the water to organic ratio ranges in one embodiment from about 100:0 to about 30:70, and in another embodiment from about 95:5 to about 30:70 or about 97:3 to about 40:60, and in yet another embodiment from about 95:5 to about 60:40, although the ratio can be outside of these ranges. The nonwater component of the liquid vehicle generally serves as a humectant or cosolvent which has a boiling point higher than that of water (100° C.). The organic component of the ink vehicle can also serve to modify ink surface tension, modify ink viscosity, dissolve or disperse the colorant, and/or affect the drying characteristics of the ink. In the ink compositions disclosed herein, the liquid vehicle can be present in one embodiment in an amount of from about 60 to about 99.9 percent by weight of the ink, and in another embodiment from about 80 to about 99.5 percent by weight of the ink, and in yet another embodiment from about 90 to about 99 percent by weight of the ink, although the amount can be outside these ranges.

The inks disclosed herein also contain a colorant. The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Reactive Dyes, such as Reactive Red Dyes (No. 4, 31, 56, 180, and the like), Reactive Black dyes (No. 31 and the like), Reactive Yellow dyes (No. 37 and the like); anthraquinone dyes, monoazo dyes, disazo dyes, phthalocyanine derivatives, including various phthalocyanine sulfonate salts, aza(18)annulenes, formazan copper complexes, triphenodioxazines, and the like; and the like, as well as mixtures thereof. The dye is present in the ink composition in any desired or effective amount, in one embodiment from about 0.05 to about 15 percent by weight of the ink, in another embodiment from about 0.1 to about 10 percent by weight of the ink, and in yet another embodiment from about 1 to about 5 percent by weight of the ink, although the amount can be outside of these ranges.

Examples of suitable pigments include black pigments, white pigments, cyan pigments, magenta pigments, yellow pigments, or the like. Further, pigments can be organic or inorganic particles. Suitable inorganic pigments include, for example, carbon black. However, other inorganic pigments may be suitable such as titanium oxide, cobalt blue (CoO—$Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW 18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle and to prevent clogging of the ink channels when the ink is used in a thermal ink jet printer or a piezoelectric ink jet printer.

The colorants can be used to form colorant dispersions that are incorporated into the acrylate latex to form the ink. In embodiments, the colorant dispersion has an average particle size of from about 20 to about 600 nm, or from about 20 to about 500 nm, or from about 30 to about 300 nm. In embodiments, the surfactant used for the colorant dispersion is the same type of surfactant that used for acylate latex.

Within the ink compositions disclosed herein, the colorant is present in any effective amount to achieve the desired degree of coloration, in one embodiment in an amount of from about 0.1 to about 15 percent by weight of the ink, in another embodiment from about 1 to about 10 percent by weight of the ink, and in yet another embodiment from about 2 to about 7 percent by weight of the ink, although the amount can be outside these ranges.

In one embodiment, the acrylate elastomer has a tensile strength of at least about 0.5 MPa, in another embodiment at least about 1.0 MPa, and in yet another embodiment at least about 3.0 MPa, and in another embodiment at least about 5.0 mPa, and in one embodiment no more than about 25 MPa, in another embodiment no more than about 20 MPa, and in yet another embodiment no more than about 18 MPa, as measured by ASTM D412C, although the tensile strength can be outside of these ranges.

In one embodiment, the acrylate elastomer has an elongation at break of at least about 150%, in another embodiment at least about 200%, and in yet another embodiment at least about 400%, and in one embodiment no more than about 1100%, in another embodiment no more than about 1000%, and in yet another embodiment no more than about 800%, as measured by ASTM D412C, although the elongation at break can be outside of these ranges.

In one embodiment, the acrylate elastomer has a hardness (Shore A) value of at least about 20, in another embodiment at least about 30, and in yet another embodiment at least about 40, and in one embodiment no more than about 90, in another embodiment no more than about 85, and in yet another embodiment no more than about 80, as measured by ASTM 2240, although the hardness can be outside of these ranges.

In one embodiment, the acrylate elastomer latex has a glass transition temperature of at least about −70° C., in another embodiment at least about −50° C., and in yet another embodiment at least about −40° C., and in one embodiment no more than about 25° C., in another embodiment no more than about 0° C., and in yet another embodiment no more than about −10° C., although the Tg can be outside of these ranges.

The ink composition can further comprise crosslinkers. In embodiments, the crosslinker is an organoamine, a dihydroxy aromatic compound, isocyanate, a peroxide, a metal oxide, or the like, as well as mixtures thereof. Crosslinking can further enhance the physical properties of the images generated from the ink composition. The crosslinker can be present in any desired or effective amount, in one embodiment at least about 0.1 percent by weight of the ink, in another embodiment at least about 1 percent by weight of the ink, and in yet another embodiment at least about 5 percent by weight of the ink, and in one embodiment no more than about 20 percent by weight of the ink, in another embodiment no more than about 15 percent by weight of the ink, and in yet another embodiment no more than about 10 percent by weight of the ink, although the amount can be outside of these ranges.

Other optional additives to the inks include biocides, fungicides, pH controlling agents such as acids or bases, phosphate salts, carboxylates salts, sulfite salts, amine salts, buffer solutions, and the like, sequestering agents such as EDTA (ethylene diamine tetra acetic acid), viscosity modifiers, leveling agents, and the like, as well as mixtures thereof.

In one embodiment, the ink composition is a low-viscosity composition. The term "low-viscosity" is used in contrast to conventional high-viscosity inks such as screen printing inks, which tend to have a viscosity of at least 1,000 cps. In specific embodiments, the ink disclosed herein has a viscosity of in one embodiment no more than about 100 cps, in another embodiment no more than about 50 cps, and in yet another embodiment no more than about 20 cps, although the viscosity can be outside of these ranges. When used in ink jet printing applications, the ink compositions are generally of a viscosity suitable for use in said ink jet printing processes. For example, for thermal ink jet printing applications, at room temperature (i.e., about 25° C.), the ink viscosity is in one embodiment at least about 1 centipoise and in one embodiment is no more than about 10 centipoise, in another embodiment no more than about 7 centipoise, and in yet another embodiment no more than about 5 centipoise, although the viscosity can be outside of these ranges. For example, for piezoelectric ink jet printing, at the jetting temperature, the ink viscosity is in one embodiment at least about 2 centipoise, and in another embodiment at least about 3 centipoise, and in one embodiment is no more than about 20 centipoise, in another embodiment no more than about 15 centipoise, and in yet another embodiment no more than about 10 centipoise, although the viscosity can be outside of these ranges. The jetting temperature can be as low as about 20 to 25° C., and can be in one embodiment as high as about 90° C., in another embodiment as high as about 60° C., and in yet another embodiment as high as about 40° C., although the jetting temperature can be outside of these ranges.

The ink compositions can be of any suitable or desired pH. For some embodiments, such as thermal ink jet printing processes, pH values in one embodiment are at least about 2, in another embodiment at least about 3, and in yet another embodiment at least about 5, and in one embodiment up to about 11, in another embodiment up to about 10, and in yet another embodiment up to about 9, although the pH can be outside of these ranges.

The ink compositions in one embodiment have a surface tension of at least about 22 dynes per centimeter, in another embodiment at least about 25 dynes per centimeter, and in yet another embodiment at least about 28 dynes per centimeter, and in one embodiment no more than about 40 dynes per centimeter, in another embodiment no more than about 38 dynes per centimeter, and in yet another embodiment no more than about 35 dynes per centimeter, although the surface tension can be outside of these ranges, for example at least about 15, 20, or 40 dynes per centimeter.

The ink compositions in one embodiment contain other particulates having an average particle diameter of no larger than about 5 μm, in another embodiment no larger than about 2 μm, in yet another embodiment no larger than about 1 μm, and in still another embodiment no larger than about 0.5 μm, although the particulate size can be outside of these ranges. In specific embodiments, the acrylate elastomer is in an emulsion form in the ink, having an average particle diameter of in one embodiment no larger than about 2 microns, in another embodiment no larger than about 1 micron, and in yet another embodiment no larger than about 0.5 microns, although the particulate size can be outside of these ranges.

The ink compositions can be prepared by any suitable process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in one embodiment from about 5 to about 10 minutes. Alternatively, the optional ink additives can be mixed with the other ink ingredients during the ink preparation process, which takes place according to any desired procedure, such as by mixing all the ingredients, heating if desired, and filtering.

In a specific embodiment, the inks are prepared as follows: 1) preparation of an emulsion of a first acrylate elastomer diluted with water and a co-solvent; 2) preparation of an emulsion of a second acrylate elastomer diluted with water and a co-solvent; 3) preparation of a dispersion of a colorant stabilized with a surfactant; 4) mixing of the acrylate elastomer emulsions together with the colorant dispersion; 4) optional filtering of the mixture; 5) addition of other additives; and 6) optional filtering of the composition. In specific embodiments, one or more surfactants can be used in the formulation so long as they are all compatible with each other. The phrase "compatible" means that there is an absence of neutralization (pH or charge) or reaction between them. The best indication of this is that no major or large agglomerates form after mixing the acrylate elastomer emulsion and the colorant dispersion. This can be characterized by particle size measurement. For example, the particle size of the mixture is substantially the same as that before mixing.

Also disclosed herein is a process which comprises applying an ink composition as disclosed herein to a substrate in an imagewise pattern.

The ink compositions can be used in a process which entails incorporating the ink composition into an ink jet printing apparatus and causing droplets of the ink to be ejected in an imagewise pattern onto a substrate. In a specific embodiment, the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. In yet another embodiment, the printing apparatus employs a piezoelectric ink jet process, wherein droplets of the ink are caused to be ejected in imagewise pattern by oscillations of piezoelectric vibrating elements. Any suitable substrate can be employed.

In a specific embodiment, the process entails printing the ink onto a deformable substrate, such as textile, rubber sheeting, plastic sheeting, or the like. In some embodiments, the substrate is a stretchable substrate, such as textile or rubber sheets. In other embodiments, the substrate is a plastic which is deformable at an elevated temperature higher than the glass transition temperature of the plastic, for example, in the process of molding into 3-dimensional objects. When the ink disclosed herein is used, the imagewise pattern will not be damaged upon molding. The rubber sheets with the imagewise pattern can be used, for example, as wrap for a 3-D object.

In one embodiment, the inks disclosed herein can be printed on a rubber substrate, such as natural polyisoprene, polybutadiene rubber, chloroprene rubber, neoprene rubber, butyl rubber (copolymer of isobutylene and isoprene), styrene-butadiene rubber, silicon rubber, nitrile rubber (which is a copolymer of butadiene and acrylonitrile), ethylene propylene rubber, ethylene propylene diene rubber, epichlorohydrin rubber, polyacrylic rubber, ethylene-vinyl acetate, polyether block amides, polysulfide rubber, chlorosulfonated polyethylene as Hypalon, or the like. In a specific embodiment, the inks disclosed herein can be printed on a silicon rubber, polyacrylic rubber, butyl rubber, or neoprene rubber substrate and the imaged substrate can be stretched in one axial direction (i.e., along the x-axis, as opposed to both the x-axis and the y-axis) to in one embodiment at least 110%, in another embodiment at least 150%, in yet another embodiment at least 200%, and in yet another embodiment at least 500% of the length of its original dimension in one embodiment at least about 50 times, in another embodiment at least about 100 times, and in yet another embodiment at least about 500 times, without exhibiting cracks or delamination.

In embodiments, the images generated with the inks disclosed herein form continuous layer on the substrate. Therefore, the images will have a small color difference with or without stretching. This is in contrast to some conventional stretchable images that are composed of dots array. Images based on discontinuous dots array have poor image quality, especially upon stretching, for example, the color density will decrease dramatically. In embodiments, the images generated with the stretchable ink composition has color difference (ΔE) less than 5.0, or less than 3.5, or less than 2.0, or less than 1.0, when stretched in one axial direction to about 150%, as measured for example by a color difference meter (a spectrophotometer). It is generally known that untrained naked human eyes cannot differentiate the colors with color difference (ΔE) values of <3.0. Color difference (ΔE) values of >6.0 are considered a very obvious color difference. Color difference is the difference or distance between two colors. Equations governing color difference are well known to those skilled in the art and include the CIEDE2000 standard definition set forth by the International Commission on Illumination (CIE).

In one embodiment, the inks disclosed herein can be printed on a silicon rubber, polyacrylic rubber, butyl rubber, or neoprene rubber substrate and the imaged substrate can be submerged in water for in one embodiment at least about 1 day, in another embodiment for at least about 1 week, and in yet another embodiment for at least about 1 month, without exhibiting damage to the imagewise pattern.

In a specific embodiment, the images generated with the inks disclosed herein have a good chemical resistance. For example, they can exhibit good to excellent resistance toward alcohols, acetic acid, acetamide, allyl bromide, allyl chloride, benzoyl chloride, ethers, esters, hydrocarbons, blood, salt solutions, and the like.

In embodiments, the images have an excellent adhesion on various substrates prior to or after stretching.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Latex Preparation

An acrylate latex Plextol B 500 and Acronal 500D (solid content 50 wt % each) commercially available from Kremer Pigmente GmbH & Co. KG, Germany were used in this study. Plextol B500 is an aqueous pure acrylic dispersion of a copolymer based on butyl acrylate and methacrylate. It has a glass transition temperature about 9° C., tensile strength at break about 3 N/mm$^2$, elongation at break about 500. Acronal 500D is an aqueous dispersions of copolymer based on acrylic acid ester and vinyl acetate. It has a glass transition temperature about −13° C., tensile strength at break about 1.5 N/mm$^2$, elongation at break about 2,500.

Examples 1 and 2

The acrylate latexes were mixed with two co-solvents to reduce the viscosity while also reducing the possibility of material drying in the print nozzle. It has been found that ethylene glycol and ethoxylated glycerol were most effective to reduce the drying time of the ink when used in conjunction. Both emulsions were diluted with water, ethylene glycol and ethoxylated glycerol at various ratios. Particle sizes of the various mixtures were analyzed to show compatibility between the co-solvent and the latex. Even at the maximum tested co-solvent content, the average particle size of the latex remains unchanged when compared to the pure latex (with no solvent added). Table 1 below shows the particle sizes.

TABLE 1

| Co-Solvent | Acronal Particle Size (nm) | Plextol Particle Size (nm) |
|---|---|---|
| Ethylene Glycol | 208 | 127 |
| None | 203 | 129 |

With the particle analysis showing no aggregation of the latex upon the addition of co-solvent, a pigment dispersion comprising phthalocyanine green pigment (Green 7) (20 wt % solid contents) was added and particle size was followed. Once again, the mixture containing the latex, pigment dispersion, and the co-solvent showed no agglomerates. Viscosity measurements were performed to optimize the latex to solvent ratio for printing. It was found a viscosity of roughly 6 cPs was optimal for inkjet printing.

It has been determined that this optimized viscosity could be achieved with two different ink formulations. First, by increasing the ethoxylated glycerol content, a water-based ink (45 wt % water, 30 wt % co-solvent) could be formulated with the desired properties and reduced nozzle clogging. Second, reducing the ethoxylated glycerol content and increasing the ethylene glycol content could produce an alcohol-based ink (50 wt % solvent, 30 wt % water) with the same viscosity. The formulation of both ink formulations are summarized in the Table 2 below. Additional characterization of the ink surface tension was performed to confirm that the values were within a suitable range for inkjet printing.

TABLE 2

| | Ethylene glycol based Ink | Aqueous based Ink |
|---|---|---|
| Contents | | |
| Emulsion (50 wt % solids) | 15 wt % | 20 wt % |
| Ethylene Glycol | 45 wt % | 15 wt % |
| Ethoxylated Glycerol | 5 wt % | 5 wt % |
| Pigment Dispersion (20 wt % solids) | 5 wt % | 5 wt % |
| Water | 30 wt % (in lieu of ethylene glycol) | 45 wt % |
| Ink Properties | | |
| Viscosity | 6 ± 0.2 mPa-s | 5.8 ± 0.2 mPa-s |
| Surface Tension | 35.35 dynes | 34.63 dynes |

Inks made according to the formulas above were used to print durable images using a DMP-2800 inkjet printer equipped with 10 pL cartridges. The inks were printed on an elastomeric latex rubber substrate. Optimal printing conditions were found to be 20 μm drop spacing with a substrate temperature of 35° C. The resulting image had good resolution of features and was continuous and defect-free over the entire printed area.

After printing, the image was dried with no special conditions in ambient air (about 25° C.). The printed image was very robust, adhering to the substrate even after thorough rubbing. No visible cracks, de-lamination or other defects were detected by the naked eye after stretching the substrate over 300% in multiple directions for hundreds of times. The image was tested for adhesion using the tape test. After multiple stretch-relaxation cycles, no material was removed after application of a 3M scotch tape, as shown in FIG. 1.

Figure 2:
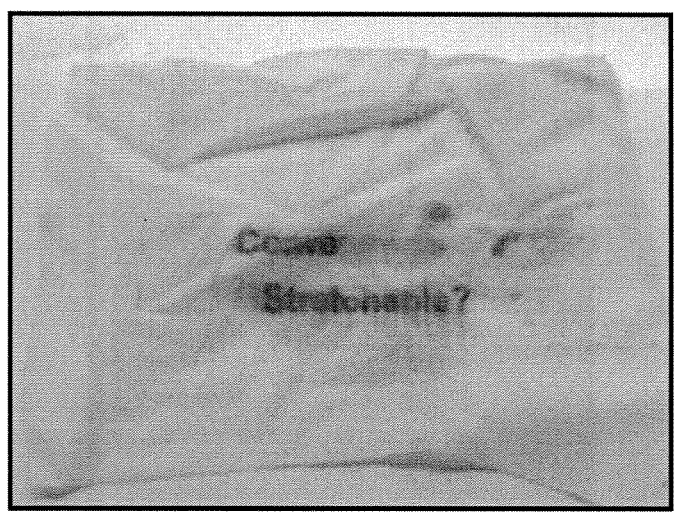
FIG. 2 is a photograph of an image (after stretching another elastomeric latex substrate about 30 times) on a deformable substrate printed using a conventional ink.

As a comparison, a conventional ink (Dimatix Model Fluid) generally used with DMP model printers was also used to print on the same rubber substrate. Although the fresh prints stayed well on the substrate, the images could be easily wiped off with the finger after a few stretch-relaxation cycles, as shown in FIG. 2. This indicated that the conventional ink is not stretchable.

Besides the phthalocyanine green pigment used in the example, it should be noted that other pigments can be used as well. Exemplary pigments include but not limited to iron oxide, carbon black, zinc white and zinc ferrite, titanium white, yellow, beige, and black, cadmium yellow, red, green, and orange, cobalt violet and blue, chromium yellow and green, copper pigments such as Azurite, Han purple, Paris Green, Phthalocyanine blue, verdigris, viridian, and the like, and mixtures thereof.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A stretchable ink composition comprising:
a surfactant;
an acrylate elastomer latex, wherein the acrylate elastomer latex comprises a mixture of a first acrylate latex and a second acrylate latex, the first acrylate latex further comprising an emulsion of a first acrylate elastomer with water and a first co-solvent and the second acrylate latex further comprising an emulsion of a second acrylate elastomer with water and a second co-solvent, the first acrylate latex having a glass transition temperature of greater than 10° C. and the second acrylate latex having a glass transition temperature of less than 0° C.; and
a colorant, wherein the stretchable ink composition is capable of printing and forming robust images on a deformable substrate and further wherein an image printed with the stretchable ink composition can be stretched from greater than 300% to about 500% in multiple directions without exhibiting any visible cracks or delamination to the naked human eye.

2. The stretchable ink of claim 1, wherein the acrylate elastomer latex comprises a copolymer selected from the group consisting of a copolymer of acrylate and chloroethylvinyl ether, a copolymer of acrylate and acrylonitrile, a copolymer of acrylate and styrene, a copolymer of acrylate and vinyl acetate, a copolymer of acrylate and ethylene, a copolymer of acrylate and methacryate and mixtures thereof.

3. The stretchable ink of claim 1, wherein the acrylate elastomer latex comprises copolymers of butyl acrylate and methacrylate or copolymers of acrylate and vinylacetate.

4. The stretchable ink of claim 1, wherein the first acrylate latex has a glass transition temperature of less than 100° C.

5. The stretchable ink of claim 1, wherein the second acrylate latex has a glass transition temperature less than about −20° C.

6. The stretchable ink composition of claim 1, wherein the acrylate elastomer latex has an average particle size of from about 20 to about 600 nm.

7. The stretchable ink of claim 1, wherein the acrylate elastomer latex is present in an amount in a range of from about 1 to about 25 percent by weight of the total weight of the stretchable ink.

8. The stretchable ink of claim 1, wherein the surfactant is selected from the group consisting of anionic surfactants, cationic surfactants, nonionic surfactants, zwitterionic surfactants.

9. The stretchable ink of claim 1, wherein the colorant is a pigment dispersion, and a surfactant used in the pigment dispersion comprises the same type as the surfactant in the acrylate elastomer latex.

10. The stretchable ink of claim 1, comprising a viscosity in a range of from about 3 to about 50 cps at room temperature and a jetting viscosity of from about 3 to about 20 cps.

11. The stretchable ink of claim 1, wherein an image printed with the stretchable ink composition can be stretched from about 101% to about 500% in multiple directions without exhibiting any visible cracks or delamination to the naked human eye.

12. The stretchable ink of claim 1, wherein, the water to co-solvent ratio comprises a range of from about 95:5 to about 30:70.

13. The stretchable ink of claim 1, wherein the co-solvent is an alcohol or alcohol derivative selected from the group consisting of aliphatic alcohols, aromatic alcohols, diols, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, and higher homologues of polyethylene glycol alkyl ethers.

14. The stretchable ink of claim 13, wherein the co-solvent is ethylene glycol, N-methylpyrrolidone, methoxylated glycerol, ethoxylated glycerol, and mixtures thereof.

15. A stretchable ink composition comprising:
a first latex comprising an emulsion of a first acrylate elastomer with water and a first co-solvent;
a second latex comprising an emulsion of a second acrylate elastomer with water and a second co-solvent; and
a dispersion comprising a colorant and a surfactant;
wherein the first acrylate elastomer has a glass transition temperature of greater than 10° C. and the second acrylate elastomer has a glass transition temperature of less than 0° C. and further wherein an image printed with the stretchable ink composition can be stretched from greater than 300% to about 500% in multiple directions without exhibiting any visible cracks or delamination to the naked human eye.

* * * * *